April 2, 1963  F. A. KROHM  3,083,395
WINDSHIELD WIPER BLADE ASSEMBLY
Original Filed April 8, 1953
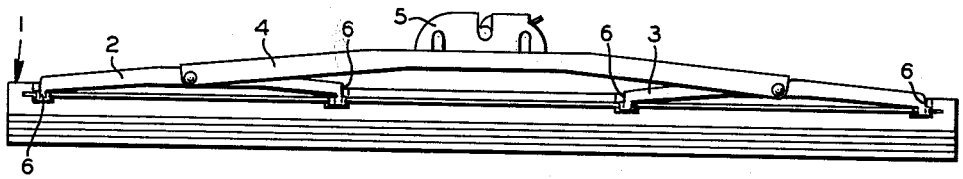
Fig. 1
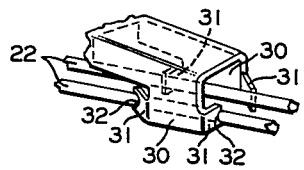
Fig. 2
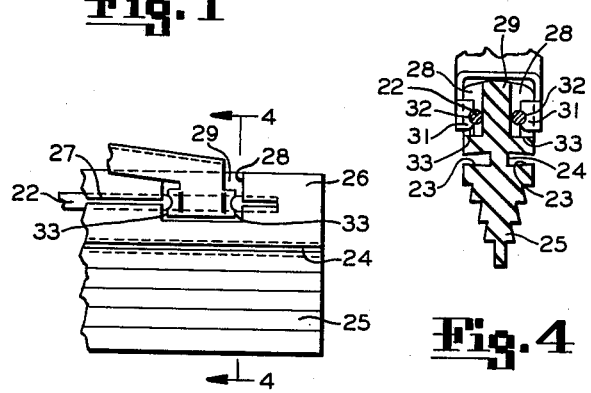
Fig. 3
Fig. 4
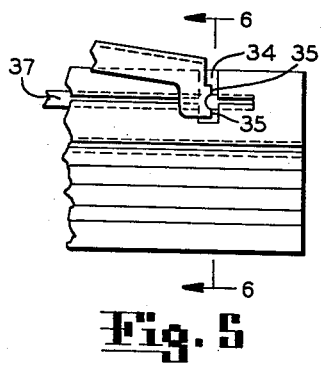
Fig. 5
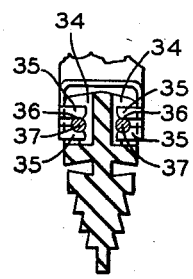
Fig. 6
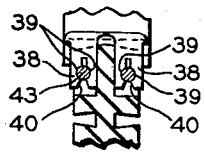
Fig. 7
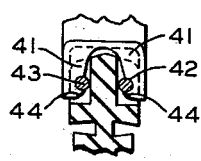
Fig. 8
INVENTOR.
FRED A. KROHM
BY *Charles S. Penfold*
*Kenneth E. Wolden*
ATTORNEY United States Patent Office 3,083,395
Patented Apr. 2, 1963

3,083,395
WINDSHIELD WIPER BLADE ASSEMBLY
Fred A. Krohm, Hobart, Ind., assignor to The Anderson Company, a corporation of Indiana
Original application Apr. 8, 1953, Ser. No. 347,572, now Patent No. 2,925,615, dated Feb. 23, 1960. Divided and this application Feb. 5, 1960, Ser. No. 7,017
17 Claims. (Cl. 15—250.42)

This invention relates generally to windshield wiper apparatus and more particularly is directed to a wiper blade assembly or unit.

At least one form of wiper blade assembly now in use for wiping flat and/or curved surfaces of windshields comprises a blade and a pressure-distributing device operatively connected to the blade. More specifically in this regard, the blade is preferably comprised of a resilient wiper element and a flexible support therefor, and the pressure-distributing device preferably includes a pair of secondary yokes having their ends pivotally connected to the blade and a primary yoke or bridge means having its extremities connected to intermediate portions of the secondary yokes. The primary yoke or bridge is provided with a connector detachably connectible with a fitting carried by a wiper arm.

In wiper blade assemblies of the above or similar character, the operative relationship of the secondary yokes with the blade and the primary yoke is such that in some instances, depending on weather conditions, snow will collect and pack between these parts to such an extent that the parts cannot move relative to one another. As a consequence, the blade assembly will not function properly or conform to the curvature of the surface to be cleaned.

One objective of the present invention is to embody improved principles of design and construction in a blade assembly of the type above referred to whereby there is little or no opportunity for snow or other foreign matter to collect and interfere with the operation of the wiper blade assembly.

A significant object of the invention is to provide the ends of the secondary yokes with receiving or bearing means through which the flexible support extends to interconnect these yokes and the support in a manner whereby the blade may rock to some extent relative to the pressure device and/or the wiper element with respect to the support or pressure device. These particular relative movements and those occurring between the three yokes not only contribute to cause the wiper element to readily conform and efficiently clean a surface to be wiped, but serve to prevent the deposit or collection of any snow on the assembly and also break up and release any sleet or ice that might otherwise collect on the assembly.

An important object of the invention is to provide the ends of the secondary yokes with receiving means through which the flexible members of the support are extended for simultaneously holding the members in the grooves of the element and the pressure device detachably connected to the blade.

A significant object of the invention is to provide the resilient wiper elements with integral portions which can be manipulated to receive and partially conceal the ends of the flexible members of the support and assist in detachably locking the members in place.

Another object of the invention is to provide an arrangement whereby the secondary yokes are provided with receiving means and the flexible members of the support are held in relation to the receiving means by the inherent resilience of the wiper element.

A further object of the invention is to reduce to a minimum vibration and noise occurring between the movable components of the wiper assembly.

Other attributes of the invention reside in its simplicity of design and construction, economy of manufacture, durability and efficiency of operation.

Many other objects and advantages of the invention will become evident when the description herein set forth is considered in conjunction with the drawings annexed hereto.

In the drawings:

FIGURE 1 is a side view of the windshield wiper blade assembly embodying the invention;

FIGURE 2 is a perspective view of a construction showing one way of affording a snap connection between the ends of the secondary yokes and the flexible members of the support;

FIGURE 3 is an enlarged partial view showing the application of the components in FIGURE 2 to a wiper element;

FIGURE 4 is a transverse section taken substantially on line 4—4 of FIGURE 3;

FIGURE 5 is a view similar to FIGURE 3 illustrating another way in which the secondary yokes can be snapped into connection with the flexible members of the support;

FIGURE 6 is a transverse section taken substantially on line 6—6 of FIGURE 5;

FIGURE 7 is a transverse section similar to FIGURE 6 showing a further setup for effecting a detachable snap connection between a pressure device and a blade; and FIGURE 8 is a transverse section taken through an additional form of wiper assembly.

This application is a division of my copending application Serial No. 347,572 filed April 8, 1953, now Patent No. 2,925,615.

Provision is made whereby a pressure device may be readily snapped into assembly and disassembly with respect to a wiper blade. One way of accomplishing this feature is illustrated in FIGURES 1, 2, 3 and 4 of the drawing. More particularly, the wiper assembly shown in these figures preferably includes a pressure device having secondary yokes operatively connected to a blade and a primary yoke attached to the secondary yokes. The blade includes a resilient wiper element and a flexible support therefor preferably in the form of a pair of spaced flexible members or portions 22. The sides of the resilient wiper element are provided with one pair of longitudinal extending grooves 23 which form a neck or hinge portion 24 hingedly connecting a wiper head portion 25 with an attaching portion 26. The attaching portion, in turn, is provided with side grooves 27, within which the flexible members 22 are confined. It will be observed that the grooves 27 are shorter in length than the length of the element and terminate in abutments. The wiper element is also preferably formed with four pairs of corresponding recesses 28 intersecting the grooves 27, each pair of recesses having a common longitudinally extending medial wall 29 therebetween. Assembly of the wiper element and flexible members is preferably effected by manipulating the same so that the flexible members can be snapped broadside into the grooves for automatic retention therein without prior manipulation of the abutments or end portions of the wiper element. The snap connection between the flexible members and wiper element is partly due to the character of the wiping element and flexible members.

The extremity of each secondary yoke is preferably provided with a channel formation which includes the base wall of the yoke and depending side walls 30. Each of the side walls is provided with corresponding inturned fingers 31, the ends of which are provided with generally semicircular notches 32 which are adapted to respectively receive the flexible members constituting the support for the wiper element. Each of the end formations is so constructed that the side walls including the fingers thereon may flex a limited extent relative to one another.

Connection between the end formations of the secondary yokes with the blade is preferably accomplished by merely placing the channel formations of the secondary yokes over the wiper element in straddling relationship to the wall portions 29 of the element so that the notches 32 on the fingers of one side wall of the formation will receive one of the flexible members, after which the other flexible member is preferably manipulated or snapped into the notches of the other wall of the formation. The blade and pressure device can also be assembled by pressing the flexible members toward one another, and then arranging the end margins of the fingers on the secondary yokes in straddling relationship with the flexible members to locate the flexible members in the notches to effect an interlock between the secondary yokes and the flexible members. The fingers are preferably rounded as indicated at 33 to facilitate piloting of the flexible members into the notches or seats.

Attention is directed to the fact that those portions of the flexible members which extend through the recesses 28 may flex slightly; that the flexible members when moved toward one another will compress the wiper element; and that the side walls 30 and fingers 31 of the formations may also flex or yield to some extent, all of which contribute to produce positive snap-acting connections between the secondary yokes and the flexible members.

Another way in which the secondary yokes can be detachably connected to the wiper blade is exemplified in FIGURES 5 and 6 of the drawing. As therein illustrated the wiper element, except for recesses 34 of lesser axial extent than recesses 28, substantially corresponds to the wiper element shown in FIGURES 3 and 4. The ends of the secondary yokes are provided with formations having side walls, each side wall having a pair of inturned flexible fingers 35 having seats 36 which yieldably detachably embrace flexible members 37 constituting the support for the wiper element.

The blade and pressure device are assembled in substantially the same manner as the device and blade illustrated in FIGURES 2 through 4, by merely arranging the components so that the flexible members will be snapped into engagement with the seats on the secondary yokes.

The modification illustrated in FIGURE 7 is similar to the device shown in FIGURES 2, 3 and 4, but affords an arrangement whereby the secondary yokes and flexible members can be readily connected without prior manipulation of the flexible members. More particularly in this regard, the ends of the secondary yokes are provided with flexible fingers 38 having seats 39. The inner sides of the fingers are preferably beveled as indicated at 40 and assist in piloting the flexible members into the seats. In this construction, the wiping element does not act to hold the members in the seats.

The modification illustrated in FIGURE 8 of the drawing comprises, among other things, a plurality of secondary yokes, the ends of which are preferably formed to provide a pair of corresponding longitudinally extending side walls having inturned portions 41, the opposed parallel marginal edges of which are provided with seats 42 which are adapted to receive flexible members 43. The portions 41 are rounded to provide cam surfaces 44. To assemble the pressure-distributing device and blade of this assembly, it is merely necessary to bring the device and blade together so that the cam surfaces will engage and press the flexible members toward one another and compress those portions of the wiper element therebetween to a point where the members flex or snap into the seats as clearly illustrated. Attention is directed to the fact that the lower extremities of the inturned portions 41 project inwardly a distance slightly greater than the upper portions thereof so as to establish positive connections between the secondary yokes and flexible members and thereby prevent accidental displacement of the flexible members from the seats 42.

In view of the foregoing it will be manifest that various novel means have been provided for operatively connecting a pressure-distributing device with a wiper blade including a unique arrangement whereby the flexible members constituting the support for the wiper element can be snapped into connection with the wiper element. It will also be evident that the wiper element is provided with locking means for retaining the flexible members of the support in the grooves of the wiper element. Moreover, it will be apparent that the locking means on the wiper element serve to protect the ends of the flexible members and that such locking means in combination with the ends of the flexible members impart rigidity to the end portions of the wiper element so that they will more readily conform to the surface to be wiped. The arrangement also affords a setup whereby the resilience of the wiper element assists in detachably holding the flexible members in engagement with seats provided on the ends of the secondary yokes. Furthermore, due to the novel connections between the ends of the secondary yokes and flexible members the wiper assembly is made very silent in operation. This is partly due to the fact that portions of the wiper element constitute abutments which are alternately engaged by portions of the secondary yokes to control the flop or range of pivotal movement of the wiper blade with respect to the pressure device. It will be further noted that the components of the wiper assembly are so constructed and arranged that it is practically impossible for snow, sleet or ice to collect in the assembly and interfere with its operation.

Having thus described my invention, it is obvious that various other modifications may be made in the same without departing from the spirit of my invention, hence I do not wish to be understood as limiting myself to the exact form, construction, arrangement and combination of parts herein shown and described or uses mentioned.

I claim:

1. A windshield wiper blade and a pressure device, said blade comprising a resilient wiper element provided with a pair of longitudinally extending grooves forming a hinge joining a wiping portion and an attaching portion of the element, said attaching portion being provided with a pair of longitudinally extending grooves, a resiliently flexible support having portions secured in the grooves provided in the attaching portion, said wiper element having a portion intermediate the support and the wiping portion which is at least greater than the width of the support in order that outer surfaces of the support are inset with respect to outer marginal surfaces of said intermediate portion; said pressure device comprising a plurality of relatively movable parts, and means on at least one of said parts affording a snap connection with said support.

2. A wiper assembly comprising a pressure device having a pair of longitudinally spaced yieldable receiving means, a blade comprising a wiper element provided with a pair of longitudinally extending grooves, and a support comprising a pair of elongate flexible members seated in the grooves and cooperating with at least one of said yieldable receiving means within the confines of the element for detachably locking the pressure device and blade together.

3. A wiper assembly comprising an elongate wiper blade and an elongate pressure device provided with a connector for attaching the assembly to a wiper arm, resiliently flexible means provided on the blade, and longitudinally spaced means provided on the pressure device, the arrangement being such that when the blade and device are moved relative to one another in a substantially perpendicular direction with respect to their longitudinal axes the means on the pressure device can be brought into automatic connecting engagement with the means on the blade at a location intermediate the length of the blade without prior manual adjustment of the latter.

4. A wiper assembly comprising an elongate wiper blade having a resilient wiper element and an elongate flexible support therefor having means disposed on opposite sides of the longitudinal axis of the blade, and a pressure device having means disposed on opposite sides of the longitudinal axis of the blade and engaging the means of the support at spaced locations, said means affording a snap connection between the support and pressure device when brought into broadside engagement with one another.

5. A wiper assembly comprising an elongate wiper blade having a resilient wiper element and a flexible support therefor, said element being provided with longitudinally extending exterior grooves and said support comprising a pair of longitudinally extending side portions disposed in said grooves for disposition on opposite sides of the longitudinal axis of the wiper element, and a pressure device having means disposed on opposite sides of its longitudinal axis engaging the side portions of the support at longitudinally spaced locations, said means affording snap connections between said portions of the support and pressure device when brought into broadside engagement with one another.

6. A windshield wiper blade and a pressure device, said blade comprising an elongate resilient wiper element provided with longitudinally extending exterior grooves in its opposite sides, elongate flexible supporting means having longitudinally extending portions disposed entirely within the confines of the grooves for supporting the element, said pressure device having a plurality of pressure-applying portions, and means affording a snap connection between at least one of said pressure-applying portions and said supporting means.

7. A windshield wiper assembly comprising a blade having an elongate resilient wiper element with a wiping portion and an attaching portion, said attaching portion being provided with a groove formed in each of its exterior side walls, said grooves being parallel and facing in opposite directions, resiliently flexible support means having portions disposed in the grooves, said wiper element having portions extending outwardly from the support means to prevent the latter from engaging a surface to be wiped, and a pressure device having a pair of longitudinally spaced connection means connected to the blade for applying pressure thereto, at least one of said connection means affording a snap connection with said blade at a location between the ends of said wiping element.

8. A windshield wiper assembly comprising a blade having an elongate resilient wiping element provided inwardly from each side thereof spaced-apart longitudinally extending opposed surfaces disposed to form an exterior groove, support means having a pair of longitudinally extending flexible portions seated in said grooves and having outer marginal surfaces, said element having side portions extending laterally beyond the outer marginal surfaces of said flexible portions, a pressure device for applying pressure to the blade at longitudinally spaced locations, and means affording snap connections between said pressure device and said outer marginal surfaces of said support means.

9. A wiper assembly comprising a pressure device having a pair of longitudinally spaced connecting means, a blade comprising a wiper element provided with a pair of longitudinally extending exteriorly exposed grooves, support means having elongate flexible portions seated in the grooves, said support means and said connecting means being so constructed and arranged that they can be brought into broadside connection with one another, said wiper element having side portions disposed laterally of the flexible portions to substantially prevent one of the connecting means from engaging a surface to be wiped by the element.

10. A windshield wiper assembly comprising an elongate blade unit having a wiping element provided with means ajacent its sides, and a pressure unit having means receiving an upper portion of the blade unit and yieldably receiving the means thereon at locations intermediate the sides and length of said wiper element for applying pressure to said blade unit.

11. A windshield wiper assembly comprising an elongate blade unit having a wiper element and means disposed adjacent its opposite sides, and a pressure unit having means disposed adjacent its opposite sides for straddling at least a portion of the blade unit and engaging the means thereon at a location intermediate the length of said wiper element, said means affording snap connections between the units at locations between the sides of said wiper element.

12. A wiper assembly comprising an elongate resiliently flexible wiper blade and an elongate pressure device provided with a connector for attaching the assembly to a wiper arm, said blade including an elongate resilient wiping element, resiliently flexible means provided on the blade, and longitudinally spaced means provided on the pressure device, the arrangement being such that when the blade and device are moved relative to one another in a substantially perpendicular direction with respect to their longitudinal axes at least one of the means on the pressure device can be brought into automatic snap-locking connecting engagement with the means on the blade at a location intermediate the length of the wiping element, the connecting arrangement between said means being such that the points of pressure applied to the blade are located between side surfaces of the wiping element.

13. A wiper assembly comprising an elongate wiper blade including a resilient wiper element and an elongate flexible support therefor having longitudinally extending side portions, a pressure device having yieldable means affording snap connections with the side portions at longitudinally spaced locations intermediate the length of the blade, and said snap connections being such that the points of pressure applied to the support are disposed substantially between the sides of the wiper element.

14. A wiper assembly comprising a wiper blade and a pressure device, said blade comprising an elongate resilient element and a support therefor having portions extending along the sides of the element, said pressure device being provided with means for attaching the assembly to a wiper arm and comprising a plurality of relatively movable members for applying pressure to said blade at longitudinally spaced locations, at least one of said members being provided with a pair of spaced portions located on opposite sides of the longitudinal axis of said blade, and said spaced portions being yieldable and provided with means receiving and applying pressure to said portions of said support at points disposed between side surfaces of said element.

15. A wiper assembly comprising a wiper blade and a pressure device, said blade comprising an elongate resilient wiping element and a support therefor having portions extending along the sides of the element, said pressure device being provided with means for attaching the assembly to a wiper arm and with means for applying pressure to said blade at longitudinally spaced locations, at least one of said pressure-applying means comprising a pair of spaced portions located on opposite sides of the longitudinal axis of said blade, and said spaced portions being provided with resiliently flexible means receiving and applying pressure to said portions of said support at points disposed between side surfaces of said element.

16. In combination: a windshield wiper blade comprising an elongate resilient wiping element and an elongate support therefor having a pair of spaced portions extending along the sides of the element, a pressure device for applying pressure to said blade at longitudinally spaced locations thereon, said pressure device including a member having a pair of spaced portions located on opposite sides of the longitudinal axis of the blade, and at least one pair of said spaced portions being yieldable whereby to afford a snap-locking connection with the other pair of portions at locations disposed between side surfaces of said element.

17. An elongate resilient wiper element having a first longitudinally extending portion provided with an upper surface, and a second longitudinally extending portion joined to said first portion and provided with a bendable wiping edge, said element also having a pair of outer exposed side surfaces, a pair of longitudinally extending continuous grooves respectively interrupting these surfaces and disposed between and in spaced parallel relation to said upper surface and said edge and terminating short of the ends of the element to provide abutments, and a pair of elongate resiliently flexible members disposed in said grooves, said members being insertable broadwise into said grooves between said abutments without prior manipulation of the latter.

References Cited in the file of this patent

UNITED STATES PATENTS

| | | |
|---|---|---|
| 2,596,063 | Anderson | May 6, 1952 |
| 2,658,223 | Enochian | Nov. 10, 1953 |
| 2,687,544 | Scinta | Aug. 31, 1954 |
| 2,712,146 | Wise | July 5, 1955 |
| 2,727,270 | Bosso | Dec. 20, 1955 |
| 2,741,791 | Scinta | Apr. 17, 1956 |
| 2,782,448 | Anderson | Feb. 26, 1957 |

FOREIGN PATENTS

| | | |
|---|---|---|
| 683,375 | Great Britain | Nov. 26, 1952 |